March 5, 1968 R. W. LARSON ETAL 3,371,692
METHOD FOR HARVESTING TREES
Original Filed June 13, 1963 6 Sheets-Sheet 1

INVENTOR.
Robert W. Larson
John W. Hood and
John P. Lundberg

Meyers & Peterson
ATTORNEYS

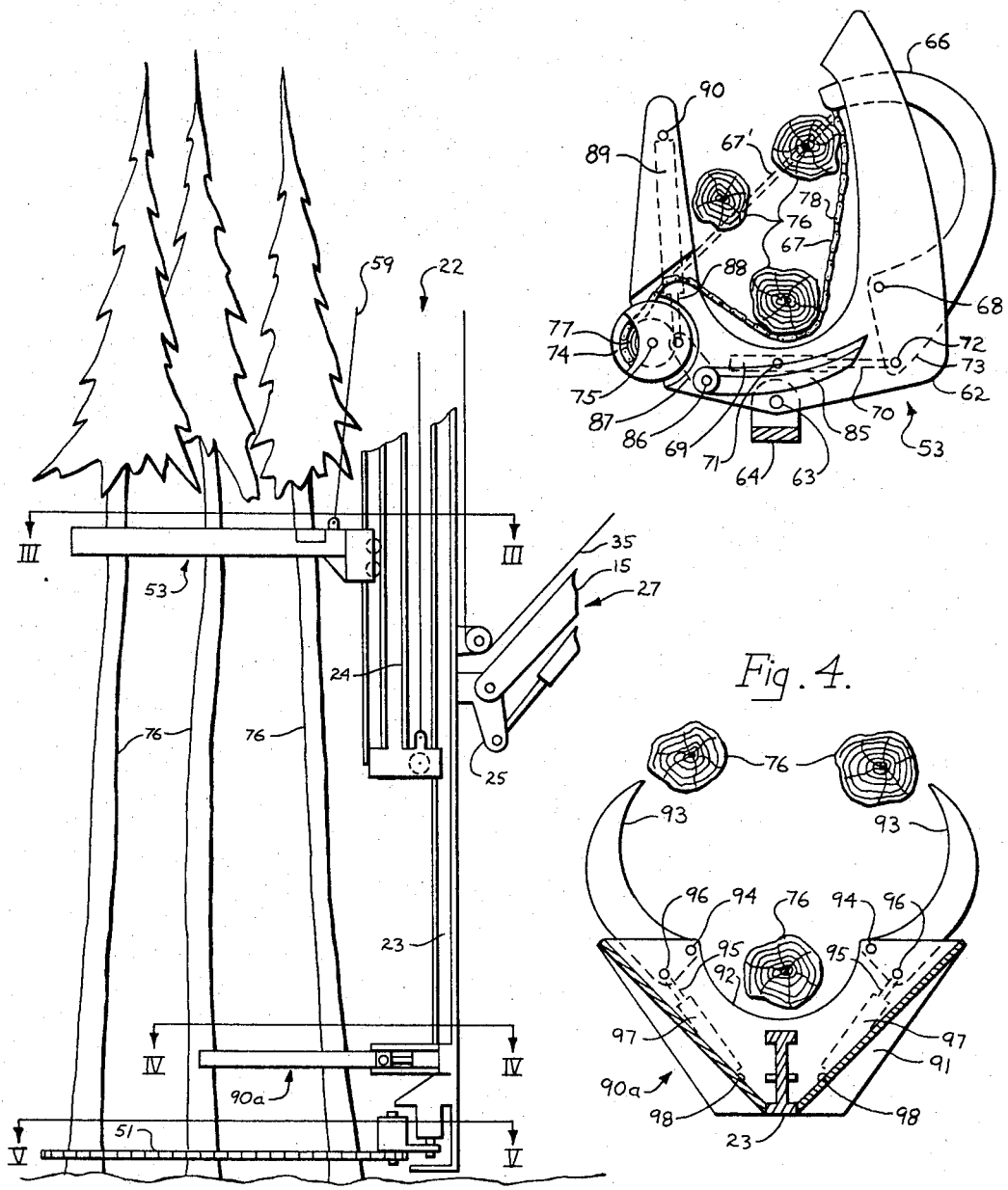

March 5, 1968 R. W. LARSON ETAL 3,371,692
METHOD FOR HARVESTING TREES
Original Filed June 13, 1963 6 Sheets-Sheet 3
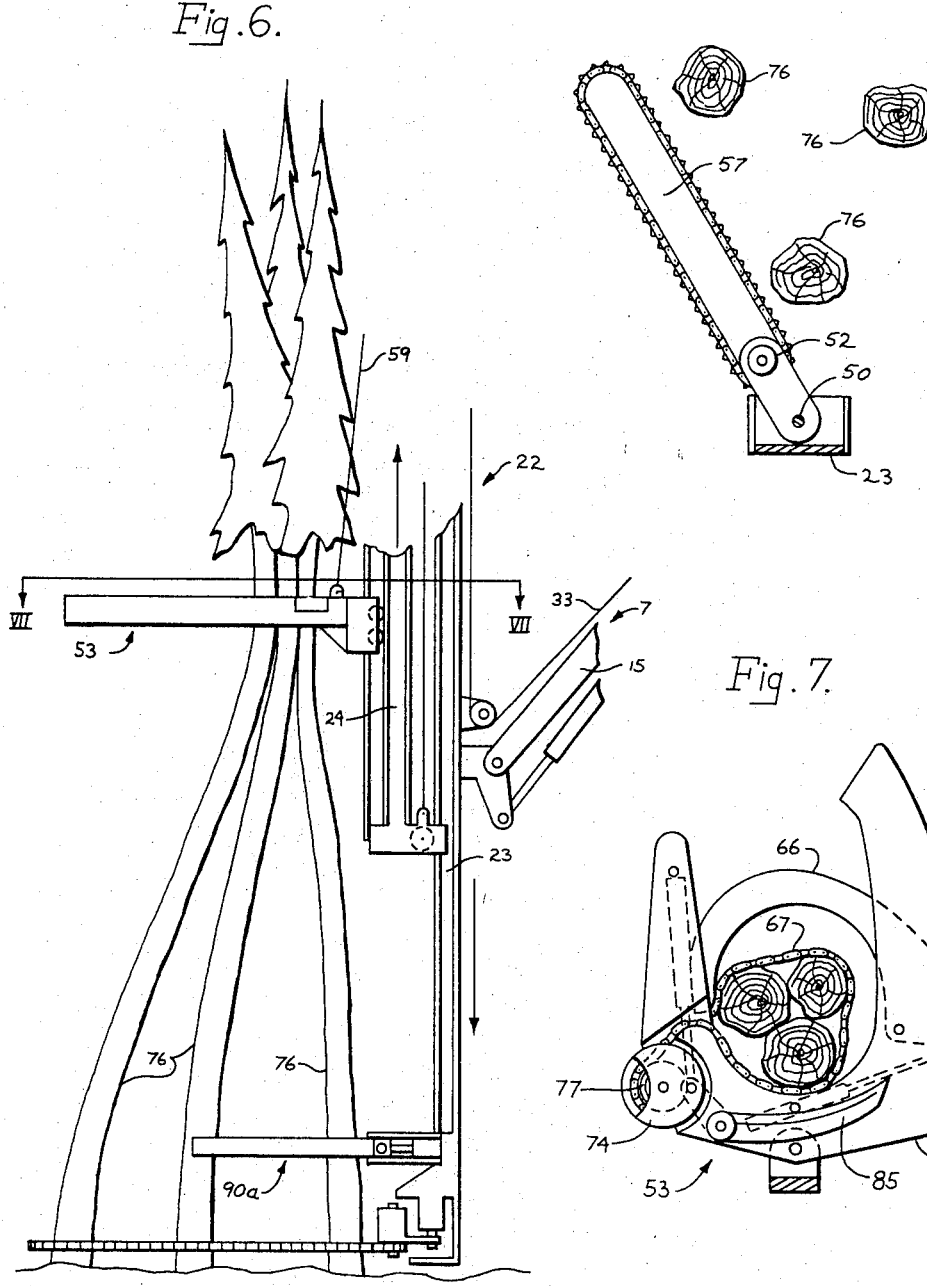
Fig. 5.
Fig. 6.
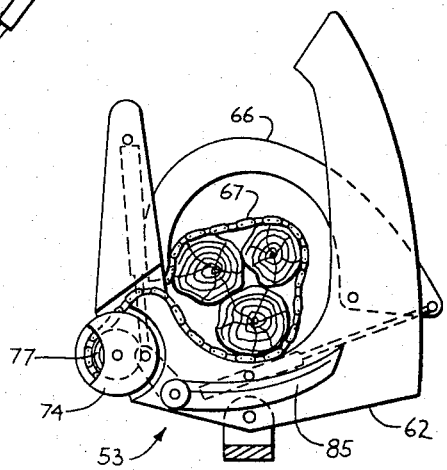
Fig. 7.
INVENTOR.
Robert W. Larson
John W. Hood and
John P. Lundberg
Meyers & Peterson
ATTORNEYS March 5, 1968  R. W. LARSON ETAL  3,371,692
METHOD FOR HARVESTING TREES
Original Filed June 13, 1963  6 Sheets-Sheet 4

INVENTOR.
Robert W. Larson
John W. Hood and
John P. Lundberg
Meyers & Peterson
ATTORNEYS March 5, 1968  R. W. LARSON ETAL  3,371,692
METHOD FOR HARVESTING TREES Original Filed June 13, 1963  6 Sheets-Sheet 5

INVENTOR.
Robert W. Larson
John W. Hood and
John P. Lundberg

Meyers & Peterson
ATTORNEYS

March 5, 1968  R. W. LARSON ETAL  3,371,692
METHOD FOR HARVESTING TREES
Original Filed June 13, 1963  6 Sheets-Sheet 6

INVENTOR.
Robert W. Larson
John W. Hood and
John P. Lundberg
Meyers & Peterson
ATTORNEYS

United States Patent Office 3,371,692
Patented Mar. 5, 1968

3,371,692
METHOD FOR HARVESTING TREES
Robert W. Larson and John W. Hood, Ashland, and John P. Lundberg, Washburn, Wis., assignors to Beloit Corporation, a corporation of Wisconsin
Original application June 13, 1963, Ser. No. 287,543, now Patent No. 3,238,981. Divided and this application Feb. 25, 1966, Ser. No. 529,989
3 Claims. (Cl. 144—309)

This is a division of application Ser. No. 287,543, filed June 13, 1963, now Patent No. 3,238,981.

This invention relates generally to the logging art and pertains more particularly to a method for delimbing and felling a plurality of trees.

In application Ser. No. 196,195, filed May 21, 1962, now abandoned, there is disclosed a tree harvesting means for swiftly shearing branches from a standing tree by impact which, broadly speaking, comprises encircling a standing tree with a blade means and then rapidly propelling the blade up and along said tree with great speed and force so as to impart sufficient momentum to the blade means to cleave by impact all protruding branches encountered thereby. We have now discovered a novel method which adapts the tree harvesting means of said co-pending application for simultaneous operation on a plurality of trees, and which comprises the main objective of this invention.

Another object of this invention is to provide a novel method adapted for simultaneous processing of a plurality of trees which comprises clamping a plurality of trees together, severing the clamped trees at their base, removing all the protruding limbs or branches from the trees, topping the trees and then delivering the processed trees to a receiving station.

A further object of this invention is to provide a novel method which can process standing trees into logs at a rate heretofore unattained.

Still another object of this invention is to provide a novel method for simultaneous felling a plurality of trees accompanied by a simultaneous delimbing of a tree.

Other objects and advantages will become more apparent from the following description and drawings in which:

FIGURE 2 is similar to FIGURE 1 illustrating the position of this apparatus in operative relationship with a plurality of trees to be processed;

FIGURE 3 is a partial view taken along line III—III of FIGURE 2 illustrating the relationship of one element of the apparatus to the trees which are to be processed;

FIGURE 4 is a partial view taken along line IV—IV illustrating another portion of the mechanism in this apparatus in relationship to the trees to be processed;

FIGURE 5 is still another partial view taken along line V—V of FIGURE 2 illustrating the relationship of still another mechanism of the apparatus relative to the plurality of trees to be processed;

FIGURE 6 is a partial view in elevation illustrating the apparatus in a subsequent step of processing a plurality of trees;

FIGURE 7 is a partial view taken along line VII—VII of FIGURE 6 illustrating the delimbing head mechanism in this step of the processing;

Figure 1:
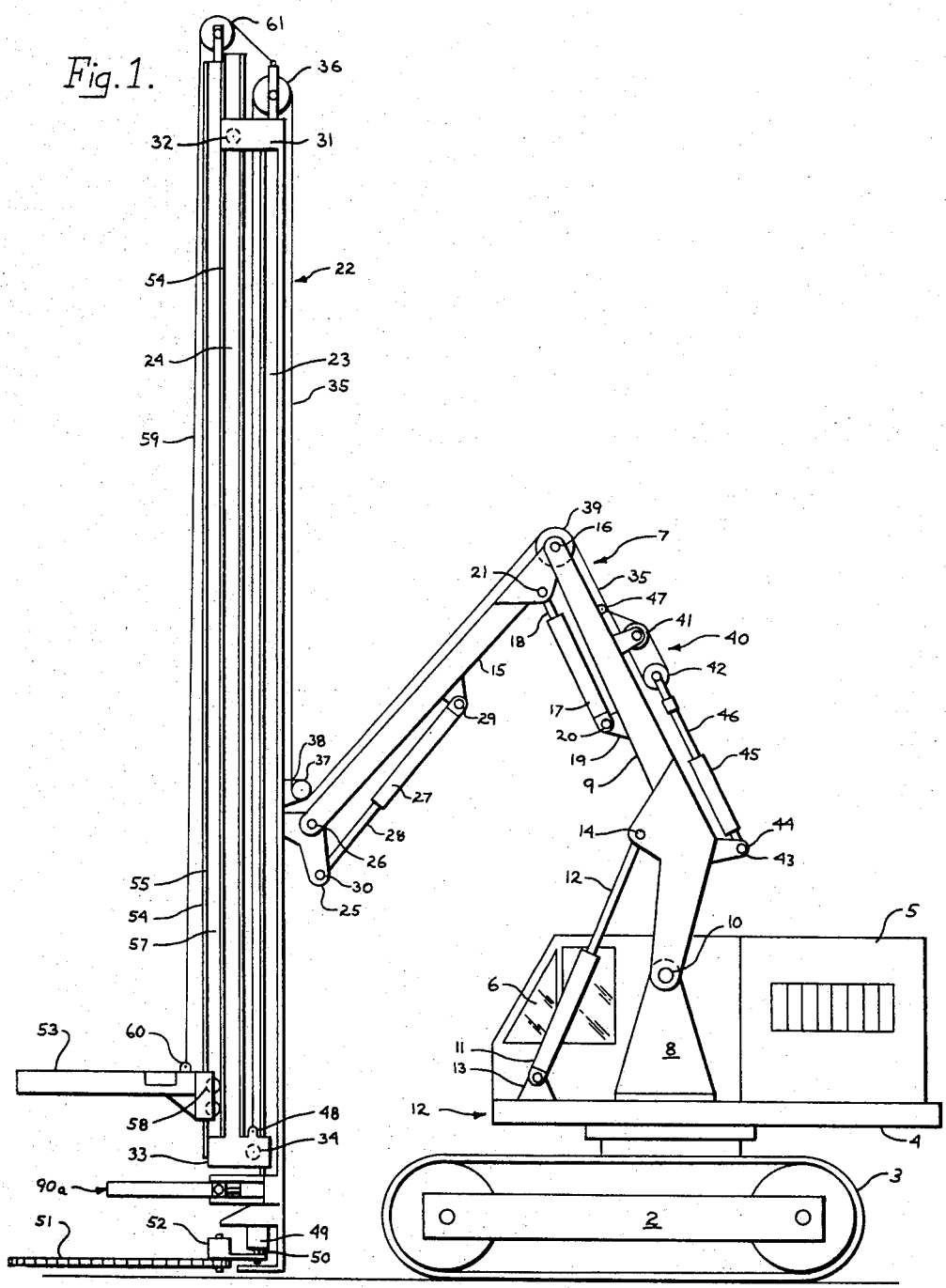
FIGURE 1 is a side elevational view of one form of apparatus which may be used in the practice of this invention.
Figure 8:
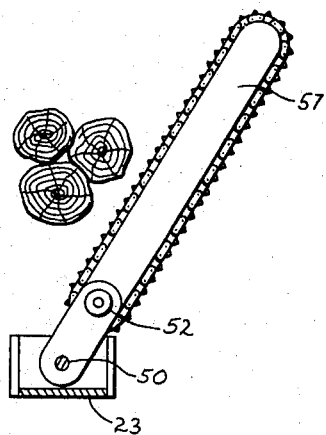
FIGURE 8 is a partial plan view illustrating a bottom cutter means of FIGURE 4 subsequent to its cutting of a plurality of trees at their base.

Referring to the drawings, FIGURE 1 shows a vehicle noted generally by the reference number 1 which can be of any of a variety of mechanical constructions, however as illustrated is provided with a chassis or frame 2 equipped with endless tracks 3. Mounted on the frame is a swinghouse assembly 4 rotatable about a vertical axis for actuation into various angular positions. The swinghouse assembly includes an engine 5 for propelling power for the vehicle as well as hydraulic power for the various cylinders yet to be described. Also located on the swinghouse assembly is an operator's cab 6.

Indicated generally by the reference number 7 is an articulated or reach boom assembly mounted on the swinghouse assembly by means of a pair of uprights or standards 8. The boom assembly includes a first arm or rear boom section 9 connected to the standards 8 by means of a pivot pin or shaft 10. The boom section 9 can be raised or lowered by means of a hydraulic cylinder 11 having an extensible piston rod 12. The closed end of the cylinder 11 is connected to an anchor ear 13 while the piston rod 12 is connected to the rear boom section 9 by means of a pivot pin 14.

As shown in the drawing, the articulated or reach boom assembly 7 also includes a second front boom section 15 pivotally connected to the rear boom section 9 by means of a pivot pin 16. Relative movement between the front and rear boom sections 15 and 19 is effected by means of a hydraulic cylinder 17 having an extensible piston rod 18 operatively connected to the boom assembly at the rear of the hydraulic cylinder by a pivot assembly 19 mounted on a pivot pin or shaft 20. Conversely, the piston rod 18 is pivotally connected to the front boom section 15 by a pivot pin 21.

Mounted at the distal end of the front boom section 15 of the articulated or reach boom assembly 7 is a sliding mast assembly 22 comprised of a first mast unit 23 operatively connected in longitudinally reciprocating relationship with a second mast unit 24, both of which are here illustrated as having an I-beam configuration. A bell crank 25 has one end fixedly secured to the first mast unit 23 and is also pivotally attached at an intermediate portion thereof to the front boom section 15 by means of a pivot pin 26. Adapting the first mast section 23 for angular movement in a vertical plane relative to this swinghouse assembly is a hydraulic cylinder 27 having a reciprocating piston 28. The closed end of the cylinder is connected to an intermediate portion of the front boom section 15 by means of a pivot pin 29 with the piston rod thereof connected in pivotal relationship to the bell crank 25 by means of a pivot pin 30. Reciprocal sliding movement between the units of the mast assembly 22 is accomplished by means of a bracket 31 fixedly attached at the top of the first mast unit 23 and which is provided with guide or slide wheels 32 which bear against the flanges of the second mast unit 24 disposed in cooperating parallel relationship to the first mast unit 23. A lower bracket 33 is affixed to the second mast unit 24 and is similarly provided with a guide or slide wheel 34 bearing against the flanges of the second mast unit 24. As will be appreciated, in this fashion the traveling second mast unit 24 is constrained to follow a parallel reciprocal path relative to the first mast unit 23 as a result of the relationship of the guide wheels 32 and 34 with the flanges of the respective masts.

In order to raise and lower the second mast unit 24 relative to the first mast unit 23, a flexible cable 35 is connected at one end to the lower end of the traveling second mast unit 24 with the remaining portion of the cable extended upwardly between the adjacent mast units 23 and 24, passed over a sheave or pulley 36, which is secured to the top of the first mast unit 23, and then the cable is passed downwardly beneath a sheave or pulley 37 rotatably mounted between a pair of lugs 38 rigidly secured to the first mast unit 23. In addition, the cable 35 is then passed by the sheave or pulley 39 rotatably mounted about the pivot pin 16 at the joint of the rear and front boom sections 9 and 15, with the cable then being operatively connected to a multiple sheave block assembly 40 comprised of, respectively, first and second sheave blocks 41 and 42 disposed in cooperating relationship with each other and adapted for effecting speed multiplication in the upward and downward travel of the reciprocating mast units through cable 35 which extends from the mast assembly to the sheave block assembly and then passes back and forth between the two multiple sheave blocks for several loops. As illustrated, the guide means for actuating the sheave block assembly comprises an anchoring bracket 43 having pivotally mounted thereto about pivot pin 44 a hydraulic cylinder 45. An extensible piston rod 46 projects from the hydraulic cylinder 45 and is secured to the multiple sheave assembly about a shaft provided in the sheave block unit 42. Anchoring of the flexible cable 35 is accomplished by suitably fastening the end of the cable at the rear boom section 46 to a suitable lug or flange affixed to this boom section as at 47. The operative connection of the flexible cable 35 to the second mast unit 24 is completed by fastening its distal end to the second mast unit 24 and in a convenient place thereon, as for example to an ear lug 48 mounted on bracket 34.

As will be appreciated, a short travel of the piston rod 46 will greatly multiply the travel of the flexible cable 35 so as to effect a swift rise and fall of the second mast unit 24 and its associated mechanism. It will be noted that the constant pressure applied to the cylinder 45 will cause the flexible cable 35 to accelerate when pulling the second mast unit 24 upwardly from a position of rest.

Fixedly and angularly mounted to the bottom of the second mast unit 24 is a tree cutting mechanism comprised of a traversing motor 49 having mounted on its shaft 50 a reciprocating rotary chain saw 51, actuated by power motor 52 with the chain saw having a reach substantially the same as the delimbing mechanism 53 subsequently described. As will be appreciated, the various motors 49 and 52 may be of any conventional design, either electric units or hydraulic motors operated from the hydraulic system of the vehicle which permits the saw to be forced into and through the tree at a predetermined rate of feed or pressure to thereby increase the speed of cutting. Normally, the traversing motor is adapted to rotate or pivot the saw through an angle sufficient to cut at the base all of the trees which are encircled and embraced within the encircling head mechanism 53; normally the traversing motor 49 will be adapted so as to be swingable through an arc of 180°.

Suitably secured by welding and the like to the second mast unit 24 is a secondary beam 54 such as an I-beam to form a T-shaped guide rail so as to provide a flange 55 which cooperates with a flange 56 on the second mast unit 24 to form a track 57 defining a guide for the wheels 58 or other suitable tracking mechanisms provided on the combined delimbing and top shearing mechanism 53 referred to above.

Vertical reciprocating movement of the delimbing mechanism 53 along the rail 57 is effected by means of a cable 59 which is connected at one end to a lug 60 fixedly secured to the delimbing mechanism 53 and passed over the sheave or pulley 61 mounted at the top of the second mast unit 24 with the other end of the cable 59 suitably attached to the bracket 31 which is fixedly secured to the first mast unit 23. As will be appreciated, this further augments the speed multiplying effect of the multiple block assembly 40 since, as will be seen, the connection arrangement of the flexible cable 59 causes the second mast unit 24 to travel upwardly but at half the rate of the speed of the delimbing mechanism 53, and thus the net effect is a further additional multiplying force applied to the delimbing mechanism. It is believed that the terrific momentum imparted to the delimbing head can be grasped when one considers that this head has a weight of the order of between one and two tons which accelerates from a position of rest to the required effective force without being permitted to appreciably slow down in speed during its rise along the mast assembly 22. Similarly, when the delimbing head mechanism 53 is permitted to fall freely, due to the mass of the delimbing mechanism and the acceleration of gravity, this delimbing head mechanism maintains sufficient momentum for snapping and cleaving the butt ends of any branches which may remain on the trees.

Figure 11:
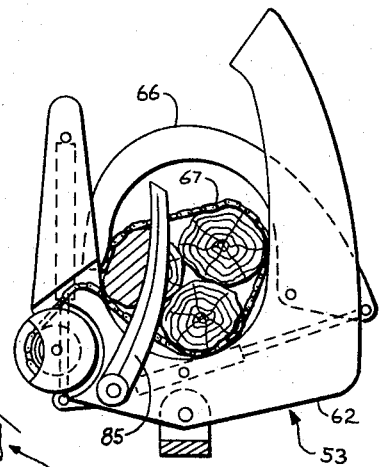
FIGURE 11 is a partial plan view of the delimbing head mechanism illustrating the operation of its top shearing mechanism for topping of the trees.

The delimbing head mechanism 53 itself comprises a U-shaped frame structure 62 which may be of a built-up welded plate construction comprised of complementary spaced and parallel plate units. As can be seen in FIGURES 3, 7 and 11, the delimbing head mechanism is pivotally mounted about a pin 63 to a U-shaped bracket 64 rigidly secured to a sliding bracket 65 which carries the delimbing head mechanism in cooperation with the slide rail 57 provided on the second mast unit 24.

For purposes of indicating the relative size of the unit, it is noted that the bight between the parallel arms of the U-shaped frame 62 is approximately eight feet in length so as to encircle a plurality of trees, three to ten and the like of roughly five inches in diameter having a height of thirty to fifty feet. As can be seen, this size of the delimbing head mechanism permits the U-shaped frame 62 to encompass within it any number of trees disposed within an eight foot area with the encirclement of the trees completed by means of an encircling arm 66 carrying with it a cooperating flexible blade mechanism 67 with the encircling arm pivotally connected to a locus within the frame structure 62 by means of a pivot pin 68. Movement of the encircling arm 66 is actuated by means of a hydraulic cylinder 69 provided with an extensible rod 70. The cylinder 69 is pivotally supported by the frame structure 62 by pin means 71 with the extensible arm assembly pivotally connected in a similar manner about a pivot pin mounted to an offset portion 73 formed or provided on the encircling arm 66. In this manner, when the piston rod 70 is retracted into cylinder 69, the arm 66 assumes the position shown in FIGURE 3. However, in contrast, when the piston rod 70 is extended outwardly, then the encircling arm 66 assumes the position shown in FIGURES 7 and 11.

Figure 14:
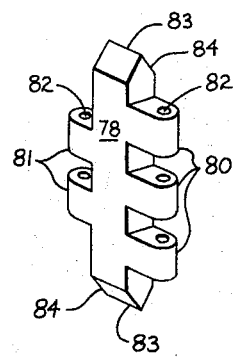
FIGURE 14 is a perspective view of a link unit employed in one form of the blade means adapted for this invention.

The actual mechanism that accomplishes the delimbing of the limbs or branches from the trees has a delimbing head 53 which moves upwardly comprised of a flexible blade structure 67 having one end secured to the free or distal end of the encircling arm 66 and the other end of the blade structure attached to a spool or drum 74 mounted for rotation about a vertical pin or shaft 75. The spool 74 may be positively driven by means of a self-contained hydraulic motor actuated by the hydraulic system of the vehicle to draw the flexible knife structure 67 to the pressure and force required to bring and clamp the plurality of trees 76 together into a tight cluster as shown in FIGURE 7. Sagging of the flexible knife structure 67 can be prevented by adapting the drum structure 74 to be biased in rotative direction as for example counterclockwise direction by means of a flat spiral spring 77 to maintain the flexible blade structure under sufficient tension as shown in FIGURE 3 when the encircling arm 66 is in a position shown in this figure and when there is no tree within the opening or bight of the U-shaped frame 62. As will be appreciated, when the U-shaped frame 62 is positioned to encircle the plurality of trees 76 within the opening of its bight, the abutment of the flexible knife structure 67 by the trees causes the flexible knife structure to be unwound from the drum or spool 74 against the action of the spring 77. Thereafter, the hydraulic cylinder 69 is actuated to extend its piston rod 70 outwardly causing the encircling arm 66 to encircle and circumscribe the trees embraced within the bight of the U-shaped frame unit 62 after which the spool or drum 74 may be positively driven by the hydraulic motor to draw or tighten up the flexible blade structure 67 to draw or clamp the trees together in a cluster such as shown in FIGURE 7. Referring more specifically to the flexible blade structure, it may take various conventional forms and in one embodiment may be formed of a plurality of links 78 shown in more detail in FIGURE 14 which are suitably connected together about the link pins 79. The links 78 may be provided with ears 80 in alternating relationship with a complementary set of ears 81 for mounting about the link pins 79 which permits the link units to be suitably connected together in a hinged or pivoted relationship. Provided at the upper or top portion of the link unit 78 is an upwardly directed knife edge 83 terminating at the bevel surfaces 84 which also functions to assist the resultant chain constructed from the units to glide over the surface of the tree trunk so as to avoid gouging the wood. As will be appreciated, the link units 78 may also be provided with a bottom knife edge 85 terminating at the apex of their associated bevel bases or surfaces 84.

Continuing with the description of the delimbing mechanism 53, this mechanism is also adapted for a shearing function by means of a shearing blade 85 (shown more fully in FIGURE 7) which is pivotally mounted to the frame structure 62 about a pivot shaft 86 adapting the shearing blade to freely move across the top of the U-shaped frame structure 62. The mechanism which actuates movement of the shearing blade 85 comprises the extension of shaft 86 downwardly through the frame structure 62 with the lower end of the shaft provided with a lever arm 87 (see FIGURE 7). The distal or free end of the lever arm 87 is pivotally connected to a piston rod 88 projecting from a hydraulic cylinder 89 having its closed end pivotally attached at an internal portion of the frame structure 62 about a pivot pin 90. As will be appreciated, when the piston rod 88 is extended or projected outwardly, the shearing blade 85 is forced to move in a counterclockwise direction of which the intermediate position is illustrated in FIGURE 11.

Figure 9:
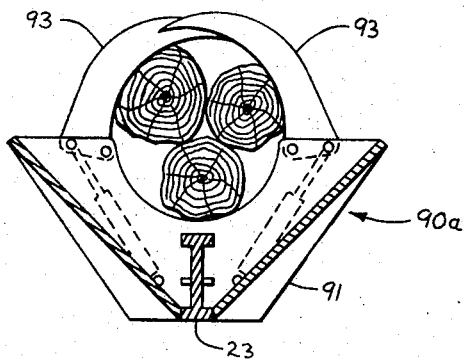
FIGURE 9 is a partial plan view of a bottom clamping mechanism of this apparatus in operative position following a bottom cutting operation of the means in the preceding figure.

Also provided on the mast assembly 22 is a clamping mechanism 90a which may be suitably mounted by bolts, welds and the like to the lower portion of the first mast unit 23 and which normally will be secured thereto in fixed relationship about eighteen inches above ground level over the rotary chain saw 51. However, if desired, the clamping mechanism 90a may be adapted for vertical adjustment by means of hydraulic cylinder and rod well known in the art. In the form illustrated in FIGURES 4 and 9, the clamping mechanism may comprise a base structure 91 having a seat or cradle 92 which may be closed by means of a pair of cooperating arms or jaws 93 which are pivotally mounted to the base structure 91 about pivot pins 94. As can be seen, the arms or jaws 93 extend forwardly of the base structure 91 and the first mast unit 23 to encompass any trees received within the reach of the arms. The arms are adapted for opening and closing movement by means of piston rods 95 having their distal ends pivotally connected about pivot pins 96 provided in the portion of the arms 93 offset from the pivot pin 94. As can be seen in the drawings, piston rods project from a hydraulic cylinder 97 having its closed end pivotally mounted about pivot pins 98 provided in the rear portion of the base structure 91. In this manner, when a plurality of trees are received within the reach of the arms 93 of the clamping mechanism 90, extension of the piston rods 91 causes the arms or jaws 93 to close in cooperating relationship with each other to clamp the trees together so as to rigidly secure the trees within the clamping mechanism. As will be appreciated, the arms may be mounted on the base structure 91 in slightly offset relationship to enable them to pass each other in overlapping and sliding relationship in interdigital fashion. Although a plurality of arms or jaws 93 have been illustrated, it is to be understood that the clamping mechanism may be readily modified to function with a single arm by mere extension of the lateral portion of the base structure 91 into an integral arm extension corresponding to one of the illustrated arms 93 with the actuating arm of such a modification being elongated and adapted for cooperative relationship with the modified integral arm.

In operation, the vehicle 1 is moved into position relative to the plurality of trees which are desired to be processed. The desired relationship between the vehicle and the trees for processing can be effected by means of the articulation of the boom assembly 7 through the agency of the hydraulic jacks mounted thereon. At any rate, whether by movement of the vehicle itself or by articulation of the boom assembly 7 or both, the delimbing head is caused to be positioned about a plurality of trees with the head at about a distance of twenty feet from the ground so as to encircle within its bight of frame 62 the number of trees 76 desired to be processed as illustrated in FIGURE 3 which bight, as indicated above, has about an eight foot distance between its arms. As the delimbing head mechanism 53 is moved into encircling relationship with the trees 76, the flexible blade structure 67 will be forcibly deflected from its phantom outlying position shown in FIGURE 3 into the partially encircling relationship shown in solid outline in this particular figure. The spool or drum 74 will unwind against the yieldability of the resilient spring 77 to permit additional portions of the blade structure 67 to unwind to the degree required. After the delimbing mechanism is positioned about the trees 76, the encircling arm 66 is caused to close by actuation of the hydraulic cylinder 69 under hydraulic pressure which extends the piston rod 70 outwardly. Since the flexible blade structure 67 is connected to the distal end of the encircling arm 66, closure of the encircling arm 66 will cause the flexible blade structure to be completely enwrapped about the number of trees 76 encircled during the closing, irrespective of the various diameters of the trees which the spool or drum 74 taking up any slack in the blade structure that may otherwise exist under the action of the frame 77. Thereafter, the spool or drum 74 may be positively driven by means of a hydraulic motor in a counterclockwise direction to draw up the trees into a cluster in which the upper portions are clamped together in abutting relationship.

After the delimbing head mechanism has clamped the trees 76 together into a cluster, the drive motor 52 of the rotary chain saw 51 is activated for the desired cutting function. Thereafter, the cutting mechanism (rotary chain saw 51) is caused to saw through the base of the trees 76 by activation of the traversing motor 49 as it passes through the processed trees. As will be appreciated, since the trees are clamped together at a height of twenty feet by the delimbing head mechanism, as each tree is severed, it becomes free to pivotally swing forward because of its weight within the reach of the extended arms 93 of the clamping mechanism 90. Thus, all the clamped and cut trees will be constrained within the embrace of the extended arms 93 of the mechanism 90 which then has its hydraulic cylinders 97 actuated with hydraulic pressure to extend the piston rods 95 outwardly to close the extended arms in clamping relationship about the plurality of trees 76 received within its reach with the clamping action of the arms 93 being of sufficient force to retain, due to the fixed securement of the clamping mechanism 90, to the first mast unit 23 in fixed relationship to the ground when tension is released on the flexible blade structure 78 of the delimbing head mechanism 53. It has been found during clamping operations of the delimber head mechanism and the clamping mechanism that a large number of the limbs are broken off as the trees are clustered together into a tight bundle due to the billowiness of the trees thus providing a preliminary delimbing operation in this respect. Although not shown, the delimbing head mechanism 53 and the clamping mechanism 90a may be provided with portable wire strapping mechanisms adapted to wire strap the tree bundle together at the top and bottom with sufficient force to cause the wires or strap to penetrate the bark and sink into the tree deep enough so that the strapping does not interfere with the subsequent delimbing operation. In this manner, the cluster of trees can be secured into a convenient bundle for convenience in subsequent handling.

After the cut trees are secured in the clamping mechanism 90a, the holding force of the spool or drum 74 is released to the operating pressure desired to relieve the tension of the flexible blade structure 78 to permit the delimbing head 53 to drop to a level just above the clamping mechanism 90. Although not shown, the operating pressure of the flexible blade structure 67 can be maintained at operating level by means of conventional accumulators during subsequent travel of the delimbing head mechanism 53 up the tree along progressively smaller diameters thereof. In conventional manner, the operating level is maintained by parallel connection of the hydraulic motor with the accumulator.

With the delimbing head machanism 53 positioned just above the lower clamping mechanism 90, the head mechanism is ready for a delimbing operation with the flexible blade structure 67 adjusted at operating pressure levels. To effect the delimbing operation by the head mechanism 53, the hydraulic cylinder 45 on the rear boom section 9 is actuated to retract the piston rod 46 to separate the multiple block assembly 40 causing the flexible cable 45 through a speed multiplication (by virtue of the multiple block assembly 40) to raise the second mast unit 24 under high speed since this cable, as indicated above, is connected directly to the lower end of the traveling second mast unit 24. As the traveling second mast unit 24 is pulled upwardly, the sheave or pulley 61 secured to the top thereof acts against the flexible cable 59 which has one end secured to the fixed first mast unit 23 by means of the bracket 31 and with the other end of the cable similarly secured to the delimbing head mechanism 53 at its bracket 65. Therefore, when the traveling first mast unit 23 moves upwardly, the delimbing head mechanism 53 is constrained to move upwardly with increased speed along the track 57 formed by rail 55. As will be appreciated, as the delimbing head mechanism moves up the tree, the trees are maintained stationary by the clamping action (of the clamping mechanism 90) under sufficient force to resist all tendency for the trees to be withdrawn therefrom under action of the vertically moving delimber head mechanism. In this regard, as will be readily seen, the holding action of the clamping mechanism 90a can be enhanced by providing its extending arms 93 with spikes to assist retention of the trees during the delimbing action.

Figure 10:
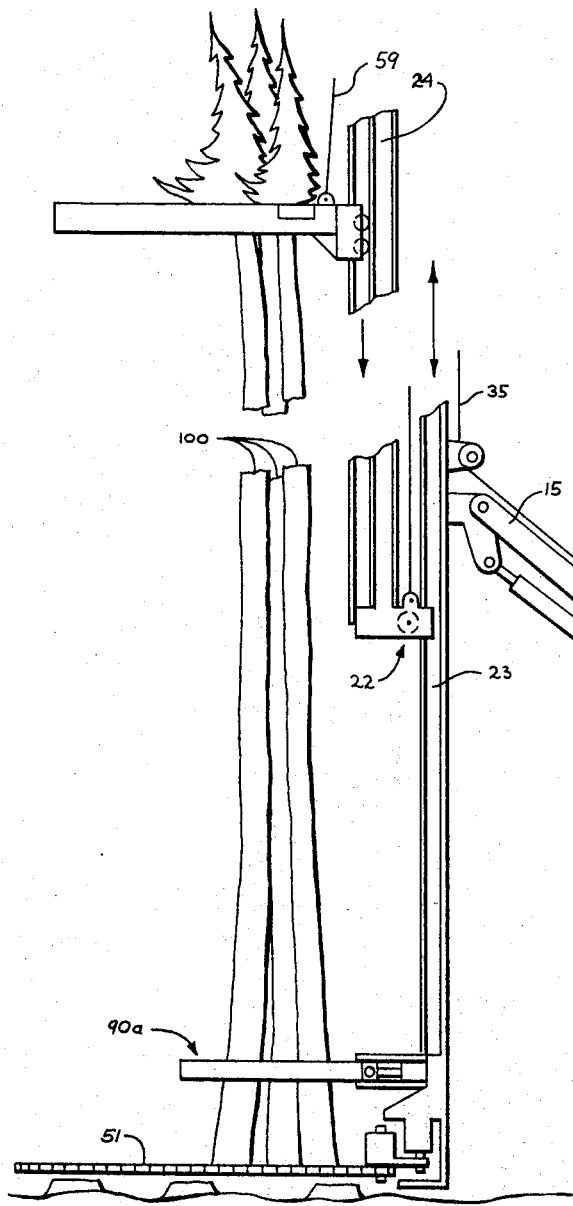
FIGURE 10 is a side elevational view of this apparatus illustrating the relationship of the apparatus during the delimbing operation.

As can be seen, due to the speed and weight of the delimbing mechanism, terrific momentum is imparted to the delimbing head mechanism to cleave by impact all of the protruding branches from the trees as the head mechanism moves upwardly thereon. In fact, it has been found that even when the flexible blade structure is comprised of conventional flat-sided blades, an effective delimbing function is similarly accomplished to distinguish the standing trees 76 from the cut and delimbed trees, the delimbed trees having been identified by the reference number 100 in FIGURE 10 which also illustrates the relative position of the delimbing head mechanism 53 at the top of the trees after the delimbing operation.

When the delimbing head 53 reaches the desired height on the trees which height is determined largely by the usable length of the trees, then the operator activates the hydraulic cylinder 89 to extend the piston rod 88 and thus force, through lever 87 and pivot pin 86, the top shear 85 to rotate in a counterclockwise direction, thus topping trees of their undesired top portions.

As will be appreciated during this topping operation, the flexible blade structure of the delimbing head mechanism is clamped about the trees together in associated action with the clamping mechanism 90a.

This coacting clamping action of the delimbing head mechanism and clamping mechanism maintains the trees secured to the mast at which time the operator of the vehicle moves the mast with the trees (by articulation of the boom assembly) over to any receiving station such as a position on the ground and then pivots the mast assembly by means of the hydraulic cylinder 27, piston rod 28 and the bell crank 25 to determine the direction (as by orientating the mast assembly into a desired slanted position) of fall of the tree cluster or bundle. Thereafter, the operator then can retract the piston rod 70 of the delimbing head mechanism to cause the encircling arm 66 to open, freeing the trees at that point and simultaneously or concurrently therewith also activate the hydraulic cylinder 97 of the clamping mechanism 90a to cause the extended arms 93 to open, thus completely freeing the processed trees which permits the trees to fall at the predetermined station.

Figure 13:
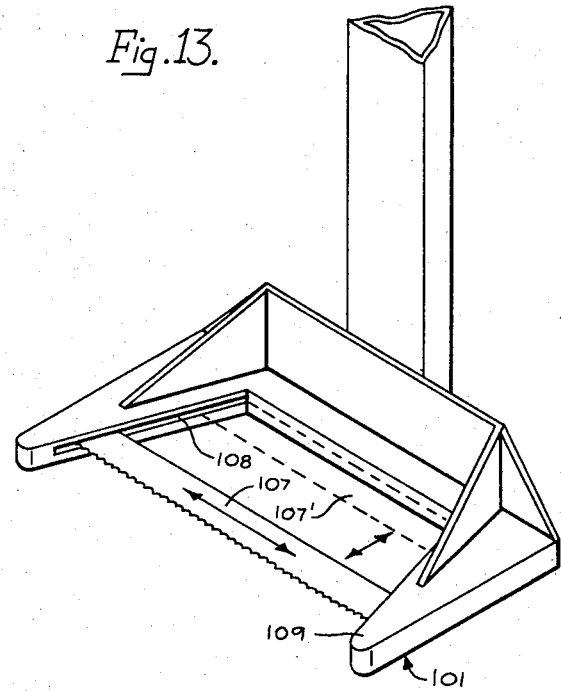
FIGURE 13 is a fragmentary view in perspective illustrating the bottom cutting means of the apparatus shown in the preceding figure.
Figure 12:
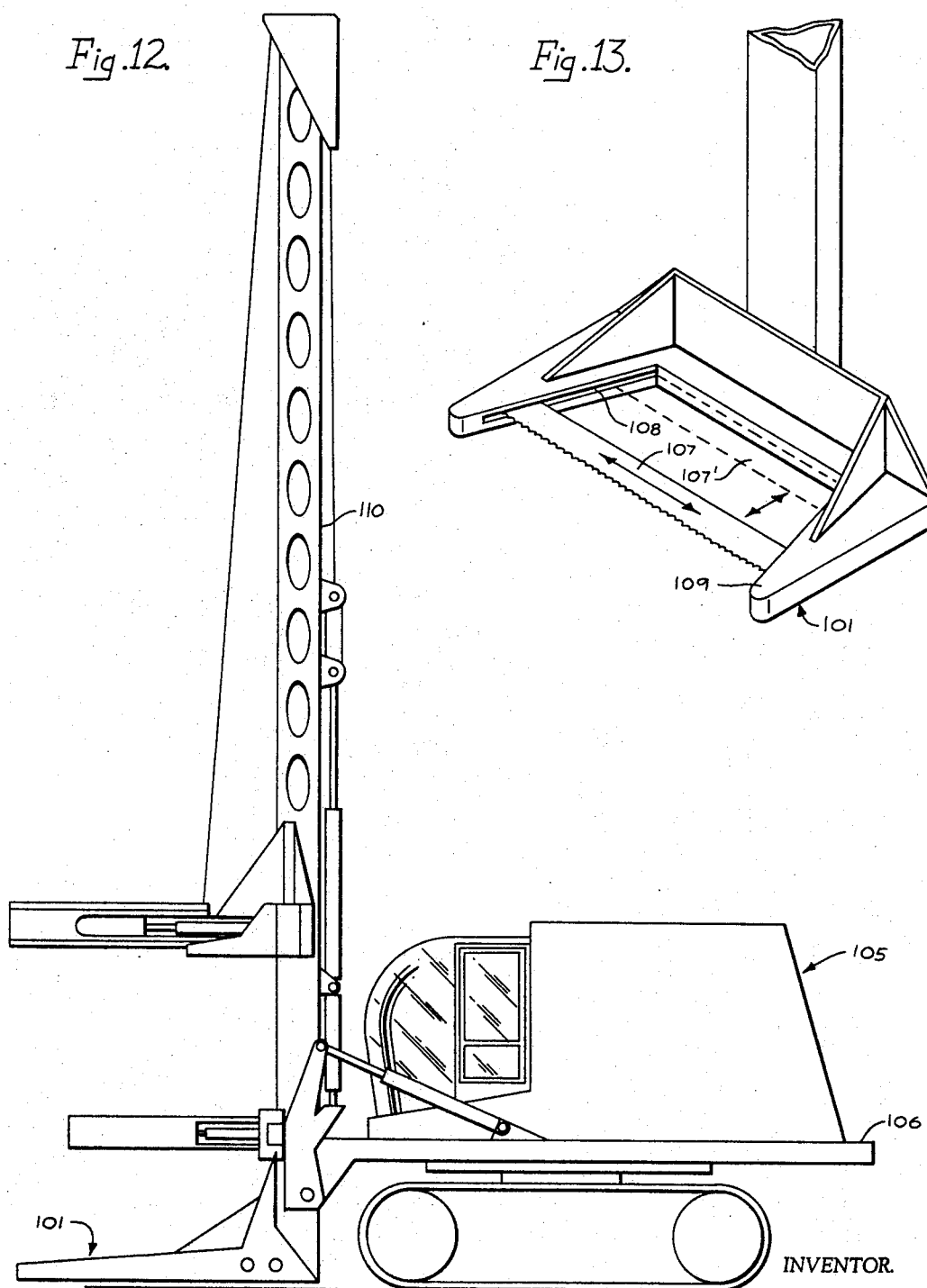
FIGURE 12 is a side elevational view of another apparatus.

FIGURES 12 and 13 illustrate a still further embodiment of this invention in which a vehicle 105 has the vertically extending mast mounted directly in pivotal relationship to the swinghouse assembly 106. In this embodiment, the delimbing head mechanism and the clamping mechanism can take the same general construction as in the preceding embodiment. As a further departure from the preceding embodiment, this modification utilizes for the bottom tree cutting means a horizontally disposed saw 107 slidably movable in lateral reciprocating action forwardly and rearwardly of the mast along slides 108 of a frame structure 109 rigidly secured to the bottom of the mast 110. Sawing action of the blade 107 can be effected by lateral reciprocating motion means well known in the art such as vibratory devices, a rotating eccentric and the like.

Although the invention has been described with reference to specific embodiments, material and details, various modifications and changes will be apparent to one skilled in the art and are contemplated to be embraced within the invention.

We claim:
1. A method of harvesting a plurality of spaced standing trees comprising the steps of encircling and tightly gripping a plurality of spaced standing trees about their upper portions to bring them into contacting relationship with each other to form a cluster thereof, cutting the trees at and from their bases and continuing to grip the trees, clamping the trees adjacent the cut bottom thereof, and delimbing said cluster of trees.

2. A method of harvesting a plurality of spaced standing trees as defined in claim 1, wherein the delimbing step is carried out by rapidly advancing a shearing head along the trees to remove the branches therefrom by impact shear.

3. A method of harvesting a plurality of spaced standing trees as defined in claim 1 comprising the further steps of moving the trees to a receiving station and there releasing said trees.

References Cited

UNITED STATES PATENTS

| | | | |
|---|---|---|---|
| 1,537,953 | 5/1925 | Lucich | 144—34 |
| 3,008,731 | 11/1961 | Bombardier | 144—34 XR |
| 3,238,981 | 3/1966 | Larson et al. | 144—34 |

WILLIAM W. DYER, Jr., *Primary Examiner.*

W. D. BRAY, *Assistant Examiner.*